Aug. 10, 1965    N. LAING    3,199,179
METHOD OF MAKING BLADED ROTORS FOR FLOW MACHINES
Filed Feb. 15, 1961    4 Sheets-Sheet 1

INVENTOR
Nikolaus Laing
Watson, Cole, Grindle & Watson
ATTORNEYS

INVENTOR
Nikolaus Laing
Watson, Cole, Grindle + Watson
ATTORNEYS

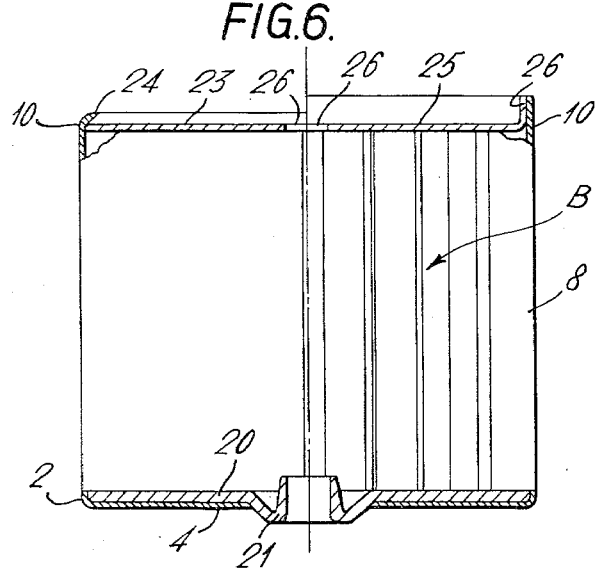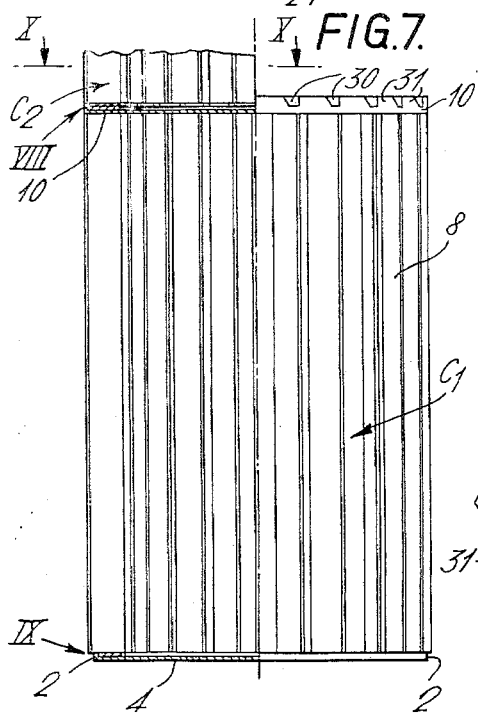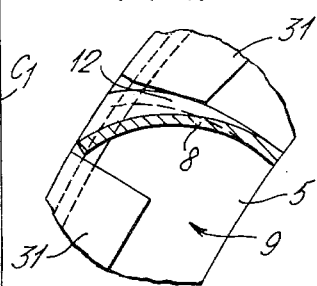

Aug. 10, 1965   N. LAING   3,199,179
METHOD OF MAKING BLADED ROTORS FOR FLOW MACHINES
Filed Feb. 15, 1961   4 Sheets-Sheet 4
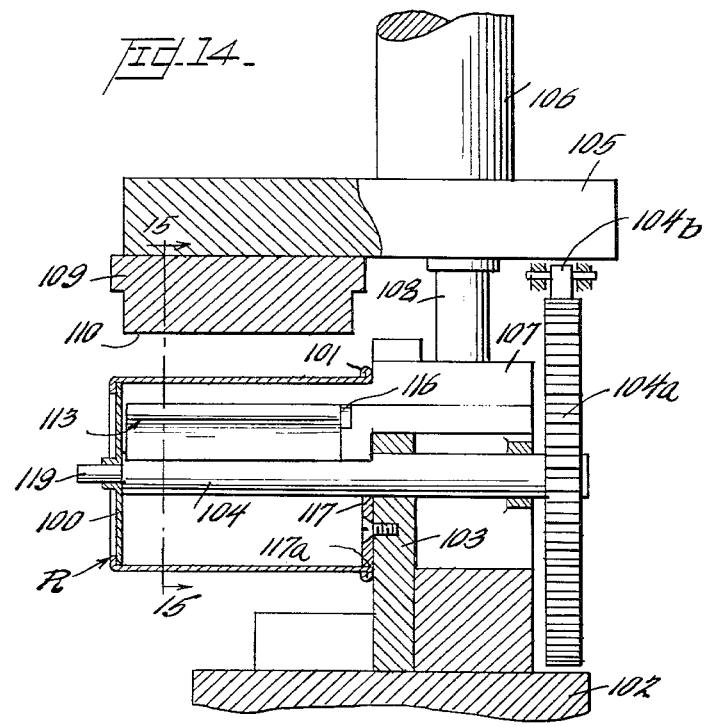
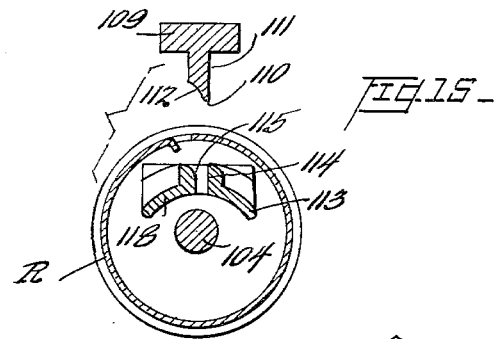
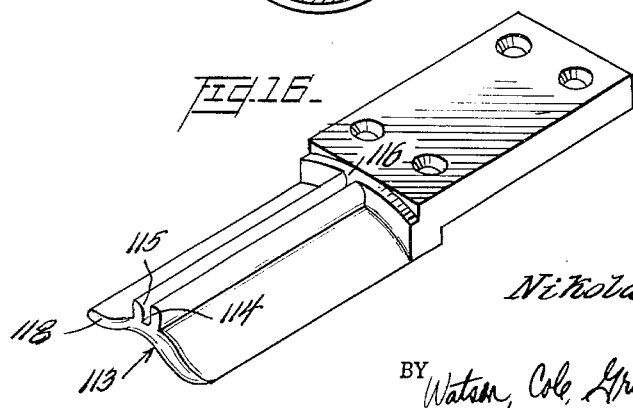
INVENTOR
Nikolaus Laing,
BY Watson, Cole, Grindle & Watson
ATTORNEYS 3,199,179
METHOD OF MAKING BLADED ROTORS
FOR FLOW MACHINES
Nikolaus Laing, Stuttgart, Germany, assignor, by mesne
assignments, to Laing Vortex, Inc., New York, N.Y.
Filed Feb. 15, 1961, Ser. No. 89,547
Claims priority, application Germany, Feb. 15, 1960,
L 35,371
7 Claims. (Cl. 29—156.8)

This invention relates to bladed rotors for flow machines and to methods of producing them: more particularly, the invention relates to rotors the blades whereof extend longitudinally of the rotor axis. The invention concerns especially, but not exclusively, rotors of the cross-flow type, that is rotors where the whole throughput flows twice through the blades of the rotor in a direction transverse to the rotor axis.

The main object of the invention is to provide a simple and effective way of making such rotors from sheet material.

With this object in view the invention provides a method of making bladed rotors which comprises the steps of forming a cylindrical pot from sheet material, shearing the cylindrical wall of the pot along lines running longitudinally thereof while the ends at least of said pot are supported against pressure set up in shearing, said shearing leaving continuous annular portions of the pot at either end thereof, and twisting the portions of the cylindrical wall between adjacent shear lines to form the blades of the rotor. The blades are preferably twisted towards the interior of the pot at the same time as the shearing. A support element such as a ring or disc can be provided at one or other end, this element being locked between the inwardly-twisted blades on the one hand and the adjacent continuous annular portion of the pot on the other. One such element can take the form of a disc with an integral hug; this provides a very convenient and readily manufactured form of rotor which can be mounted on a shaft as a simple push-fit.

The pot can be made by deep-drawing ductile sheet metal. For any given material there is a limit to the depth of draw which can be obtained; on the other hand there is no theoretical limit to the length of a cross-flow rotor. The invention accordingly provides a method of making long rotors from a plurality of rotor sections made as defined above.

The invention includes not only the above defined method of making a rotor but also rotors made by this method.

Embodiments of the invention will now be described by way of example with reference to the accompanying drawings in which:

FIGURE 3 illustrates the finished rotor with that portion to the right of the centre line being seen in axial section and that portion to the left of the centre line being a normal side elevation.

FIGURE 6 is an axial section of a rotor somewhat different from what is shown in FIGURE 3, the left hand side of the section showing a construction which differs in one respect from that of the right hand side of the section;

FIGURE 7 illustrates a composite rotor formed from two rotor sections one of which is shown only in part; to the left of the centre line the composite rotor is seen in axial section and to the right of the centre line one section only is seen in side elevation;

FIGURE 10 is a portion of a transverse section of the FIGURE 7 construction the section being taken on line X—X shown therein;

FIGURE 14 is a vertical section with some parts in elevation of a punching machine which may be used to perform the method of the present invention;

FIGURE 15 is a transverse section taken on the line 15—15 of FIGURE 14; and

FIGURE 16 is a perspective view of the die shown in FIGURE 14.

Figures 1, 2:
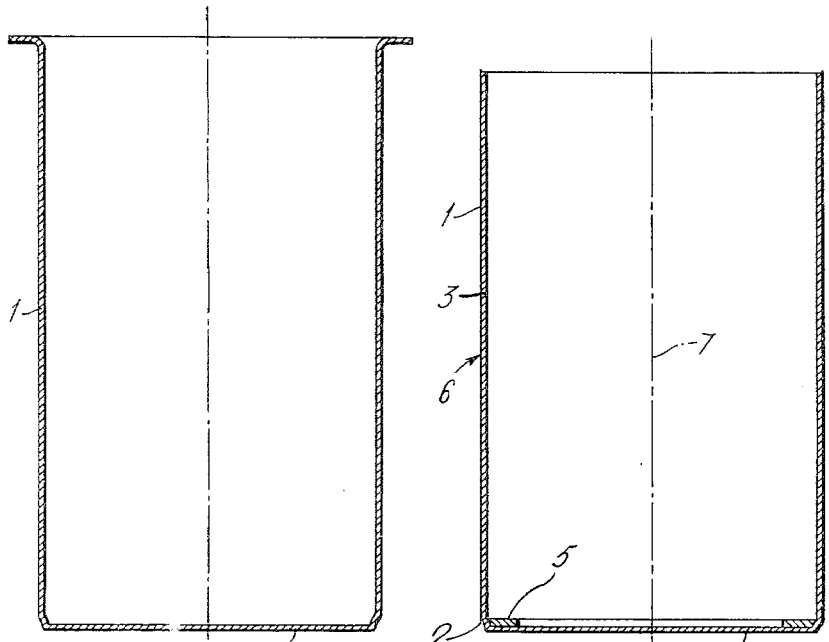
FIGURES 1, 2 and 3 are axial sections illustrating three stages in the formation of bladed rotor.
Figure 5:
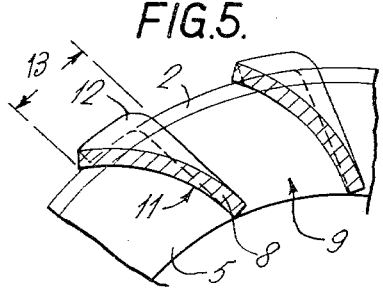
Figure 9:
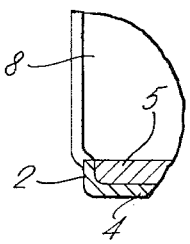

Referring to the drawings, FIGURE 1 shows a cylindrical pot 1 produced for example by drawing from ductile sheet metal; alternately an extrusion moulding process could be used. It will be seen that the portion 2 of the cylindrical wall 3 of the pot 1 adjacent its bottom 4 is displaced inwardly of the main part of this wall by about its thickness. The wall 3 is made in this way in the course of the drawing operation. A relatively rigid supporting ring 5 is inserted into the pot 1 to bring one face against the bottom 4 of the pot and its outer periphery against the inside of the wall portion 2. A knife 110 (see FIGURE 15) or a similar tool is then presented to the cylindrical wall 3 in the direction indicated by arrow 6 with its cutting edge extending and remaining parallel with the cylinder axis 7. The cylindrical wall 3 is cut through over its whole length except for the portion 2 and a portion 10 at the top of the pot (FIGURE 3) The ring 5 at the bottom of the pot and an appropriate portion of the tool which is inserted inside the pot serve as backing members during the cutting operation to ensure that the side wall 3 of the pot will not collapse and also prevent the possibility of the top and bottom ends 2 and 10 of the cylinder wall being torn. Thus one side of each longitudinal segment cut in the cylindrical wall 3 may be displaced inwardly into the interior of the pot without destroying the perfectly cylindrical shape of the pot. This operation produces a series of inwardly deflected blades 8 (FIGURE 5) adjacent blades defining ducts 9.

The blades 8 can be formed by advancing the pot 1 angularly and intermittently through a punching station wherein a punch movable radially outside of the pot cooperates with a die extending within it and supported in the manner of a cantilever. One blade is formed on each complete reciprocation of the punch and the pot then indexed to the correct position for forming the next blade, until all the blades have been formed.

It will be seen that the blades 8 are twisted inwardly as they are sheared out of the wall 3 of the pot. Over the central, and major, part of their length the blades 8 have the shape indicated at 11 in FIGURE 5. The blades 8 are joined at their top and bottom ends to the cylindrical wall portions 10 and 2 respectively by short transition portions 12 which merge into those wall portions over arcs 13 corresponding to about one third of the blade width. The transition portions 12 accommodate the twist between the central parts 11 of the blades and the wall portions 10, 2; the bottom transition portions 12 accommodate the reduction in overall diameter which gives rise to the inward displacement of the bottom wall portion 2.

For the sake of clarity these portions are only shown on the large-scale figures of drawing.

The formation of the blades 8 will now be further described with reference to FIGURES 14, 15, and 16 which illustrate a known form of punching machine modified to perform steps in the method of the present invention, as previously discussed. The rotor R shown in course of manufacture in FIGURE 14 differs somewhat from that of FIGURES 1 to 5 in that the bottom portion of the cylindrical wall is not inwardly displaced as shown in the latter figures and instead of the supporting ring 5 there shown, a centrally apertured disc 100 is employed. The rotor R resembles in these respects the rotor of FIGURE 6, to be discussed later. The rotor R has a flange 101 at its open end as shown in FIG. 1.

The punching machine of FIGS. 14, 15, and 16 has a substantial base 102 supporting a vertical face plate 103 and a stout horizontal rotatable work support shaft 104. A toothed indexing wheel 104a is keyed on the shaft 104 and cooperates with locating means 104b. Above the base 102, a punch carrier 105 is mounted for vertical reciprocation under the control of a plunger 106. A die carrier 107 is mounted, with the aid of vertical rods 108, for vertical reciprocation in timed relation with the movement of the punch carrier, as will appear.

The punch carrier 105 mounts a punch 109 having a knife edge 110 extending parallel to the axis of the work support shaft 104 over the whole length of the rotor R between the flange 101 at one end of the rotor and the supporting disc 100 at the other. The knife edge 110 is defined by a plane face 111 at one side and a face 112 on the other which is concave in cross-section (as seen in FIGURE 15) and complementary to the desired form of a rotor blade 8 as seen in cross-section. The die carrier 107 mounts a die 113 which extends within the rotor R and presents vertical and arcuate surfaces 114, 115 respectively opposite to and cooperating with the punch surfaces 111, 112. The die 113 also provides an arcuate support edge 116 which lies against the upper part of the inside of the flange 101 during punching. A fixed plate 117 secured to the face plate 103 provides a support edge 117a for the remainder of the inside of the flange 101. The die 113 further includes a support ledge 118 which underlies the formed blades during each punching step.

In operation the rotor R, in the form of a drawn pot with a plain cylindrical side wall and having the supporting disc 100 inserted, is assembled over the work support shaft 104 with the flanged end located against the face plate 103 on the support edge 117a provided by the plate 117 and the supporting disc received on a reduced end portion 119 of the support shaft. The disc 104 is caused to rotate with the support shaft during punching. Before each punching step, the die 113 is brought up to abut against the inside of the rotor R. The punch 109 then descends and severs the cylindrical wall of the rotor R along a generator thereof by the action of the knife edge 110 against the closely adjacent die surface 114. Further downward movement of the punch 109 progressively severs the rotor wall circumferentially at the ends of the cut made by the knife edge 110, by reason of the cooperation of the ends of the punch with the support edge 116 and the corresponding edge provided by the supporting disc 100, which in turn is backed up by the support shaft 104. During this downward movement of the punch 109, the portion of the rotor wall adjacent the cut is bent down and formed by cooperating surfaces 112, 115 into the desired blade configuration. The surfaces 112, 115 are relieved near their ends to provide the transition portions 12 previously referred to.

After one punching step, the punch 109 rises and the die 113 drops, and the indexing wheel 104a is rotated an angular distance equal to that separating adjacent blades in the completed rotor, and takes the rotor with it. A further punching operation then follows on an adjacent portion of the side wall of the rotor. The sequence of operations is then repeated until all the blades are formed whereupon the completed rotor is removed from the punching machine.

The inward twisting of the blades 8 locks the support ring 5 between the lower edges of the bottom transition portions 12 of the blades 8 and the bottom 4 of the pot.

Cross-flow rotors must in operation be closed at either end. While this can be done by stationary means at one or both ends it is often more convenient to provide end closures which rotate with the rotor; one or both of such end closures can then be used to support the rotor on a shaft.

FIGURE 6 shows one way of supporting a rotor on a shaft and closing the ends of the rotor. A rotor body designated generally B is formed as described with reference to FIGURES 1 to 5, except that the bottom cylindrical wall portion 2 is not displaced inwardly and instead of the support ring 5 a disc 20 is locked between the bottom 4 of the pot and the lower edges of the blades 8. This disc 20 is formed with an integral boss 21 extending in part through a central hole in the bottom 4.

Two ways of closing the top of the body 13 are shown in FIGURE 6. To the left of the centre line a disc 23 is shown which is a push fit in the upper cylindrical wall portion 10 and which is brought against the tops of the blades 8. The wall portion 10 is thereafter spun over as shown at 24 to lock the disc 23 in position. To the right of the centre line is shown a dished disc 25 presenting an annular axially and upwardly extending flange 26. This disc is once again a push fit in the upper cylindrical portion 10 of the rotor body B and is brought against the tops of the blades 8. In this case friction is relied upon to hold the disc in position. In each case the disc 23 or 25 is centrally apertured at 26 for the passage of the shaft.

Figure 3:
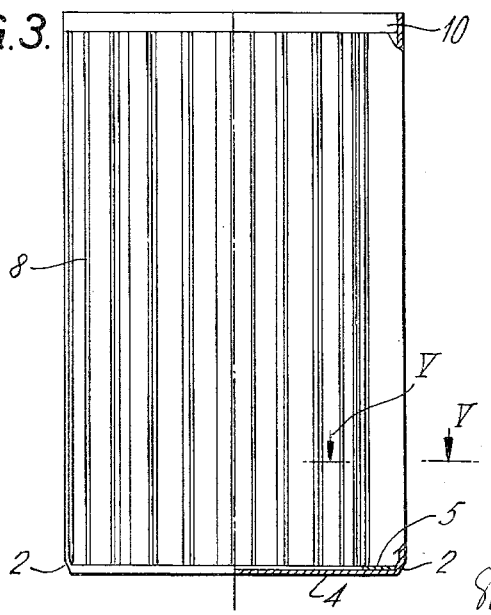
Figure 4:
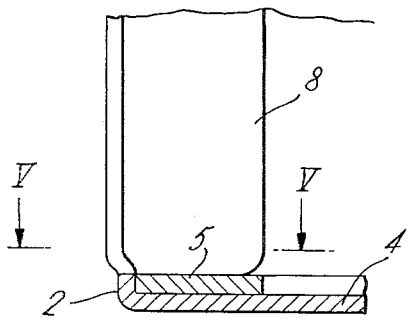
FIGURES 4 and 5 are portions respectively of an axial and of a transverse section of the rotor in the stage of FIGURE 3, the section lines of each FIGURE being indicated in the other by the lines IV, V respectively.
Figure 8:
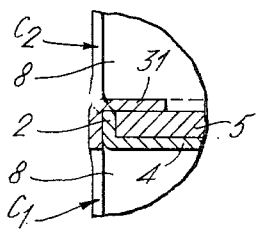
FIGURES 8 and 9 are portions of axial sections of the FIGURE 7 construction showing the parts thereof indicated by the arrows VIII and IX respectively in that figure to a greatly enlarged scale.

FIGURES 7 to 10 illustrate one method of making cross-flow rotors from rotor bodies as shown in FIGURE 3. One such body is shown at $C_1$ in FIGURES 7, 8 and 9 and part of a second similar body $C_2$ is shown in FIGURES 7 and 8. Before being secured to the body $C_2$, the body $C_1$ exactly resembles the structure of FIGURE 3, similar parts being given similar reference numerals, except that the upper cylindrical wall portion 10 is notched at 30 to leave upstanding tabs 31 as shown to the right of the centre line in FIGURE 7. As has been explained the lower cylindrical wall portion 2 is displaced inwardly by about the thickness of the material. The wall portion 2 of the body $C_2$ can accordingly be inserted within the wall portion 10, of the body $C_1$ until the bottom 4 of the body $C_2$ abuts the tops of the blades 8 of the body $C_1$; the bodies $C_1$, $C_2$ are then aligned on a common axis. The rotor bodies $C_1$, $C_2$ are assembled with the tabs 31 on the body $C_1$ opposite the ducts 9 between the blades 8 on the body $C_2$ and after assembly these tabs are turned inwardly as shown in FIGURE 8 to overlie the support ring 5 of the body $C_2$. The tabs 31 are shaped so that their sides locate between adjacent edges of the transition portions 12 of the blades 8.

Figure 11:
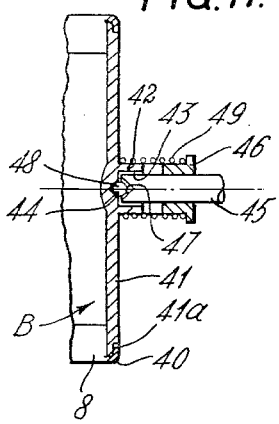
FIGURES 11, 12 and 13 are portions of transverse sections of rotors according to the invention showing three ways of supporting them for rotation.

FIGURE 11 shows a part of a rotor body B similar to that of FIGURE 6 except that the greater part of the pot bottom 4 is removed leaving only an inwardly-directed annular flange 40 which is received in a peripheral recess 41a in the support disc here designated 41. The disc 41 is formed with a central boss 42 having an axial bore 43 terminating in a small axial indentation 44. A driving shaft 45 carrying a collar 46 has one end received with play in the bore 43; a recess 47 in the end of the shaft locates a ball 48 which also extends into the indentation 44. Endwise pressure upon the ball is provided by a tension spring 49 surrounding the boss 42 and collar 46 and connected to each of them; this spring also transmits torque between the shaft 45 and the rotor. The arrangement enables the rotor to be driven and supported at one end without adverse effect from any slight misalignment as may exist between the axes of rotor and driving shaft.

Figures 12, 13:
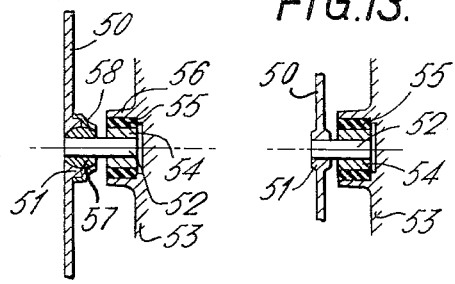

FIGURE 12 shows part of a support disc 50 for a rotor, the disc carrying an integral axially apertured central boss 51. A stub shaft 52 is mounted in a fixed part 53 by means of a metal bushing 54 surrounded by a rubber sleeve 55, the bushing 54 and sleeve 55 being received within a hollow boss 56 on the fixed part. The end of the shaft 52 projecting from the bushing carries a truncated ball 57 one end of which is received within the boss 51. A retaining ring 58 which is a push fit over the boss 51 is spun over the other end of the ball 57. The arrangement provides a support for one end of a rotor, which is unaffected by slight misalignment of the rotor shaft.

FIGURE 13 shows a simpler version of the support arrangement of FIGURE 12, wherein the ball 57 is omitted. Similar parts are given similar reference numerals.

It will be understood that if a radial-flow rotor is required the FIGURE 6 construction can be used without the end closure disc 23 or 25. Alternatively, for a cross-flow rotor, the disc 23 or 25 can be replaced by another disc which, like the disc 20, provides a hub for mounting upon a shaft. The FIGURE 7 composite rotor construction can be modified by displacing the upper cylindrical wall 10 outwardly instead of displacing the wall 2 inwardly. The means of supporting the composite rotor can be a disc such as the disc 20 secured at one end of the composite rotor as in FIGURE 6, the bottom wall 4 of each rotor body C being apertured axially and a push fit on the shaft, and the other end of the composite rotor being closed by a disc as in FIGURE 6, the disc also being apertured to receive the shaft. Alternatively a disc such as the disc 20 can be secured at either end of the composite rotor; in this case the shaft need not extend through it. As a further, and preferred, alternative the two ends of the composite rotor carry stout discs 4 supported for rotation as shown in any of FIGURES 11 to 13.

I claim:

1. A method of making a composite bladed rotor comprising the steps of forming a plurality of cylindrical pots from sheet material each pot having an open top and a bottom having one cylindrical end portion radially displaced from the other by substantially the thickness of the wall of the pot, placing a support element at the bottom of each pot with one surface against the bottom and another against the inside of the side wall over substantially the whole bottom portion peripheral extent thereof, shearing the cylindrical wall of each pot along lines running longitudinally thereof while the bottom portion of said side wall is supported by said support element against pressure set up in shearing, said shearing leaving continuous cylindrical portions at the top and bottom of the pot, while simultaneously twisting the portions of the cylindrical wall of each pot between adjacent shear lines to form rotor blades and thereby locking the support element between the bottom of the pot and the adjacent ends of the blades, forming tabs extending axially from the open top cylindrical portion of each pot, telescoping the bottom cylindrical portion of one pot with the top cylindrical portion of the next to bring the bottom of the first pot against the blades at the top of said next pot, and turning in the tabs of said next pot to locate between the blades of the first pot and hold said two pots together.

2. A method as claimed in claim 1, wherein the side wall of the body adjacent the bottom wall is displaced radially inwardly with respect to the remainder of the side wall before shearing.

3. A method as claimed in claim 1, wherein said supporting element is a disc providing an integral boss adapted to be received on a shaft.

4. A method as claimed in claim 1, wherein after the twisting step a second support element is inserted into the top of the pot with one surface against the tops of the blades and another against the continuous annular portion at the top of the pot, said last-mentioned portion being thereafter deformed to lock the support element between that portion and the blades.

5. A method as claimed in claim 1, wherein after the twisting step a second support element in the form of a dished disc presenting an upwardly and generally axially projecting flange is push-fitted into the top of the pot to bring one surface against the tops of the blades.

6. A method as claimed in claim 1, wherein the bottom cylindrical portions of said pots are displaced radially inwardly before said shearing step.

7. The method of making a bladed rotor comprising the steps of forming a seamless tubular body with a cylindrical side wall and an integral inturned bottom wall; inserting into said body a rigid flat support element of circular periphery and bringing the outer face of said element into contact with the bottom wall over an area and the periphery of the element into contact over its whole extent with the lower portion of the side wall; shearing the side wall of the body between a plane substantially coinciding with the inner face of the support element and a plane parallel thereto and spaced therefrom and from the top of the body while the lower portion of the side wall is supported by the support element against pressure set up in shearing, the shearing taking place along successive lines parallel to the axis of the body and leaving continuous annular end portions of the side wall at either end thereof; while simultaneously inwardly twisting the portions of the side wall between adjacent shear lines to form the blades of the rotor and thereby locking the support element between the bottom wall and the adjacent ends of the blades.

References Cited by the Examiner

UNITED STATES PATENTS

| 1,038,110 | 9/12 | Foss | 230—134.5 |
| 1,513,763 | 11/24 | Rowe | 230—134.5 |
| 1,876,518 | 9/32 | Mathis | 29—156.8 |
| 1,892,930 | 1/33 | Burman | 230—134.5 |
| 1,913,591 | 6/33 | Gaf | 29—156.8 |
| 2,160,598 | 5/39 | Melrath | 29—513 |
| 2,537,805 | 1/51 | Wilken | 230—134.5 |
| 2,722,625 | 11/55 | Bingeman et al. | 29—513 X |
| 2,745,171 | 5/56 | King et al. | 29—156.8 |
| 2,987,172 | 6/61 | Linsenmeyer | 230—134.5 |
| 3,050,160 | 8/62 | Chesser | 29—513 X |
| 3,061,338 | 10/62 | Clark | 29—513 X |

FOREIGN PATENTS 156,976 1/21 Great Britain.

WHITMORE A. WILTZ, *Primary Examiner.*

JOSEPH H. BRANSON, JR., *Examiner.*